US005088750A

United States Patent [19]

Beese et al.

[11] Patent Number: 5,088,750

[45] Date of Patent: Feb. 18, 1992

[54] MULTI-FUNCTIONAL WASTE CONTAINER

[75] Inventors: Ulrich Beese, Wenden-Husborn; Martin Schmidt, Breidenbach-Achenbach; Eberhard Sturm, Kreuztal, all of Fed. Rep. of Germany

[73] Assignee: Otto Industries, Inc., Charlotte, N.C.

[21] Appl. No.: 516,198

[22] Filed: Apr. 30, 1990

[51] Int. Cl.[5] .................................... B62B 1/00

[52] U.S. Cl. .................... 280/47.26; 220/908; 414/408; D34/25

[58] Field of Search ............ 220/908; 414/406, 407, 414/408, 409, 410; 280/47.26, 47.17; D34/25

[56] References Cited

U.S. PATENT DOCUMENTS

| | | | |
|---|---|---|---|
| D. 198,722 | 7/1964 | Cooper . | |
| D. 291,738 | 9/1987 | Orlowski . | |
| D. 291,739 | 9/1987 | Orlowski . | |
| 2,907,491 | 10/1959 | Gunn . | |
| 3,894,642 | 7/1975 | Shive . | |
| 4,175,903 | 11/1979 | Carson | 414/408 |
| 4,401,312 | 8/1983 | Parker | 220/908 X |
| 4,450,976 | 5/1984 | Snyder et al. | 220/908 X |
| 4,669,940 | 6/1987 | Englehardt et al. | 414/409 X |
| 4,749,101 | 6/1988 | Durkan . | |
| 4,765,503 | 8/1988 | Otto et al. . | |
| 4,836,394 | 6/1989 | Glanski | 220/908 X |

FOREIGN PATENT DOCUMENTS

| | | | |
|---|---|---|---|
| 138780 | 4/1985 | European Pat. Off. | 220/908 |
| 288066A | 10/1988 | European Pat. Off. . | |
| 2156013 | 5/1973 | Fed. Rep. of Germany . | |
| 3436566A | 4/1986 | Fed. Rep. of Germany . | |
| 3636019A | 4/1988 | Fed. Rep. of Germany . | |

*Primary Examiner*—Andres Kashnikow
*Assistant Examiner*—Michael Mar
*Attorney, Agent, or Firm*—Bell, Seltzer, Park & Gibson

[57] ABSTRACT

The invention is directed to improved waste containers of the type that is supported on wheels and adapted to be rolled by the consumer. The multi-functional waste container of the invention can be lifted and emptied by various fully and semi-automated apparatus. The waste container of the invention is both strong and durable. Included is an improved lifting surface for automatic lifting of the container; an improved shape and a durable foot access means to assist in rearward tilting of the container by the consumer; and an improved lid and handle construction which improves lid durability and can reduce container body material requirements. The body of the waste container can be injection molded as a single, integral piece with no modifications required for wheel attachment, for lid attachment or for lifting pocket or lifting bar attachment.

16 Claims, 5 Drawing Sheets

MULTI-FUNCTIONAL WASTE CONTAINER

FIELD OF THE INVENTION

The invention relates to a waste container. More specifically, the invention is directed a waste container of the type supported on wheels, adapted to be rolled by the consumer, and which can be lifted and emptied by various fully automated and semi-automated apparatus.

BACKGROUND OF THE INVENTION

Various fully automated and semi-automated refuse collection methods are becoming increasingly popular for the collection of residential waste. In these systems, the consumer uses a waste container capable of holding refuse generated by the consumer over a period of several days, up to a week. These large refuse containers are typically supported on two wheels attached to a single axle secured to the rear, bottom portion of the refuse container. At the appropriate time, the consumer moves the container to the curbside by tilting and rolling the container on its two wheels.

The semi-automated refuse collection systems employ a lifting bar attached to the refuse collection truck. The refuse container includes a downwardly open receiving pocket on its front wall and/or a lifting bar mounted transversely across a recessed center channel on the container body. The filled refuse container is manually positioned on the lifting bar of the collection truck. The lifting mechanism engages and locks into the lifting pocket and/or lifting bar of the refuse container and mechanically lifts and inverts the container for emptying of the container into the collection truck.

In the fully automated collection systems, a collection truck is provided with a mechanical gripper provided at the end of a mechanical arm. The mechanical gripper typically includes two opposed grippers having arcuately shaped engagement pads which are forced together to clamp and grip the container around its lower portion. The lift arms are then mechanically raised and the container inverted and emptied.

Refuse containers used in both fully and semi-automated lift systems are preferably provided with a pivotably attached lid which opens as the container is inverted over the refuse collection truck. As shown in, for example, U.S. Pat. No. 4,765,503 to Otto et al., the container lid can be attached to a handle at the rear of the container by means of a pair of integral flanges extending rearwardly from the lid.

Over a period of years refuse containers are subjected to a substantial amount of abuse by the fully and semi-automated lifting systems; by refuse collection laborers; and by the consumer. Thus, the container is repeatedly squeezed by the grippers of fully automated collection systems. The lid is often slammed both forwardly and rearwardly by laborers, consumers and by the various fully automated and semi-automated lifting mechanisms. Additionally, the containers are apt to be inadvertently bumped by collection trucks or other vehicles when located at curbside. Because of such substantial abuse, the useful life of the refuse container can be limited even though the container may be expensive.

Container lifetimes can be improved by structural improvements. However, various structural improvements can increase the container mass making it difficult for the consumer to tilt and roll the lo container. This difficulty can be accentuated by the large size of the container, which can range from 50 gallons up to 100 gallons or more.

Another contributing factor to shortened container life is that some container parts are often fastened by rivets, screws or the like, to the container body. Not only are these fasteners subject to breakage, but the container body can be weakened by the fasteners and assembly of the container can be complicated.

SUMMARY OF THE INVENTION

The invention provides refuse containers which are useful with both fully automated and semi-automated lifting systems. The refuse containers of the invention are extremely strong and capable of withstanding abuse and exposure to outdoor elements for substantial periods. The containers of the invention can be molded as a single, integral piece so that no container body modifications are required for lid attachment, for wheel and axle attachment or for attachment of the lifting pocket or lifting bar. Containers provided according to the invention can be readily manipulated and moved by average consumers even when the containers have a capacity of up to about 100 gallons.

In one embodiment of the invention, the waste container of the invention comprises a container body for receiving waste which includes a lower portion and an upper portion. The lower portion of the container body extends over more than half the vertical height of the container body. The lower portion of the container body includes front, rear and side wall portions, and additionally includes four beveled corner portions defining four vertical exterior faces which extend between the front and opposite side wall portions, and between the rear and opposite side wall portions of the lower container body. The four vertical exterior faces are provided with an irregular and interrupted gripping surface for engagement by a fully automated lifting apparatus which clamps onto the lower portion of the container. The irregular and interrupted gripping surface can advantageously be provided by hemispherically shaped knobs extending from the four vertical beveled corner faces. The irregular gripping surface helps to prevent slippage of the gripping arms which engage the lower portion of the container body. Preferably, the exterior gripping surface is provided by alternating thicker and thinner container wall portions.

Advantageously, the upper portion of the container has a generally rectangular horizontal cross section so that the corners of the upper portion of the container overhang the beveled corner faces of the lower container body thereby providing integral shoulders which also prevent slippage of the container while it is being lifted by fully automated lifting arms. Additionally, in preferred embodiments, the rear upper portion of the container overhangs the entire rear of the lower portion of the container, thereby providing a horizontal shoulder extending transversely across the entire back wall of the container providing further assurance that the container will not slip out of the lifting arms.

Preferably, the waste container includes an axle having wheels mounted at each end which is secured to the exterior of a forwardly inset portion of the rear wall of the container body adjacent its bottom. In this embodiment, the waste container includes a foot access means or toehold to assist the consumer in tilting of the container for rolling. An access channel is provided in the rear wall portion of the container above the axle on which is mounted the wheels for rolling of the container. The access channel extends into the rear wall of the container above the axle and forwardly past an exposed portion of the axle to allow access of a user's foot to the exposed portion of the top of the axle so that the consumer's foot can be placed directly on the axle to assist in tilting the container. The container axle, itself, is thus used to assist in tilting of the container and no exteriorly extending parts need be added to the container for assistance in tilting. The container axle is typically constructed of a material, typically a strong metal such as galvanized steel. Thus, substantial force can be exerted by the foot of the user without harm to the container.

In another preferred embodiment of the invention, the container body includes two coaxial handles secured to the body adjacent its top. The handles are spaced rearwardly from, and positioned generally parallel to, the upper rear edge of the container body. The container lid is pivotably attached to the handles by two pairs of generally planar, integrally formed lid flanges which extend rearwardly and perpendicularly from the lid. The two pairs of flanges are pivotably secured to the two coaxial handles of the container body so that each of the handles extends between one pair of the integrally formed lid flanges. The use of four lid flanges, as opposed to the two flanges typically used in the prior art, reduces the degree of stress on the container lid thereby allowing for an extended lid lifetime. In addition, the provision of two shorter handles across the rear of the container, as compared to a single handle extending fully across the rear of the container, results in material savings since a portion of the rear handle is eliminated. Thus, in this embodiment of the invention the refuse container lid is strengthened while materials used to fabricate the container are lessened. The space provided in the upper rear wall between the two handles can advantageously be used, for example, to proved optional parts such as an integral flange which can be used to lock the container to an anchoring pole or the like when the container is to be used, for example, as a public waste receptacle.

In preferred embodiments of the invention, the container body and the container lid are made by injection molding of polyethylene plastic. Thus, the thickness of all wall portions can be precisely controlled and wall thickness can be substantially increased as compared to waste containers made by other processes such as blow molding. Moreover, the waste container of the invention can advantageously be molded as a single integral piece by injection molding and container modifications such as the elimination or modification of the lifting pocket can be readily effected by adding or removing inserts to or from the container mold.

BRIEF DESCRIPTION OF THE DRAWINGS

In the drawings which form a portion of the original disclosure of the invention.

DESCRIPTION OF THE PREFERRED EMBODIMENTS

In the following detailed description, various preferred embodiments of the invention are described. It will be understood and appreciated, however, that the invention is not limited to its preferred embodiments; to the contrary, the invention includes various alternatives, modifications and equivalents within its spirit and scope as will be apparent to the skilled artisan.

Figure 1:
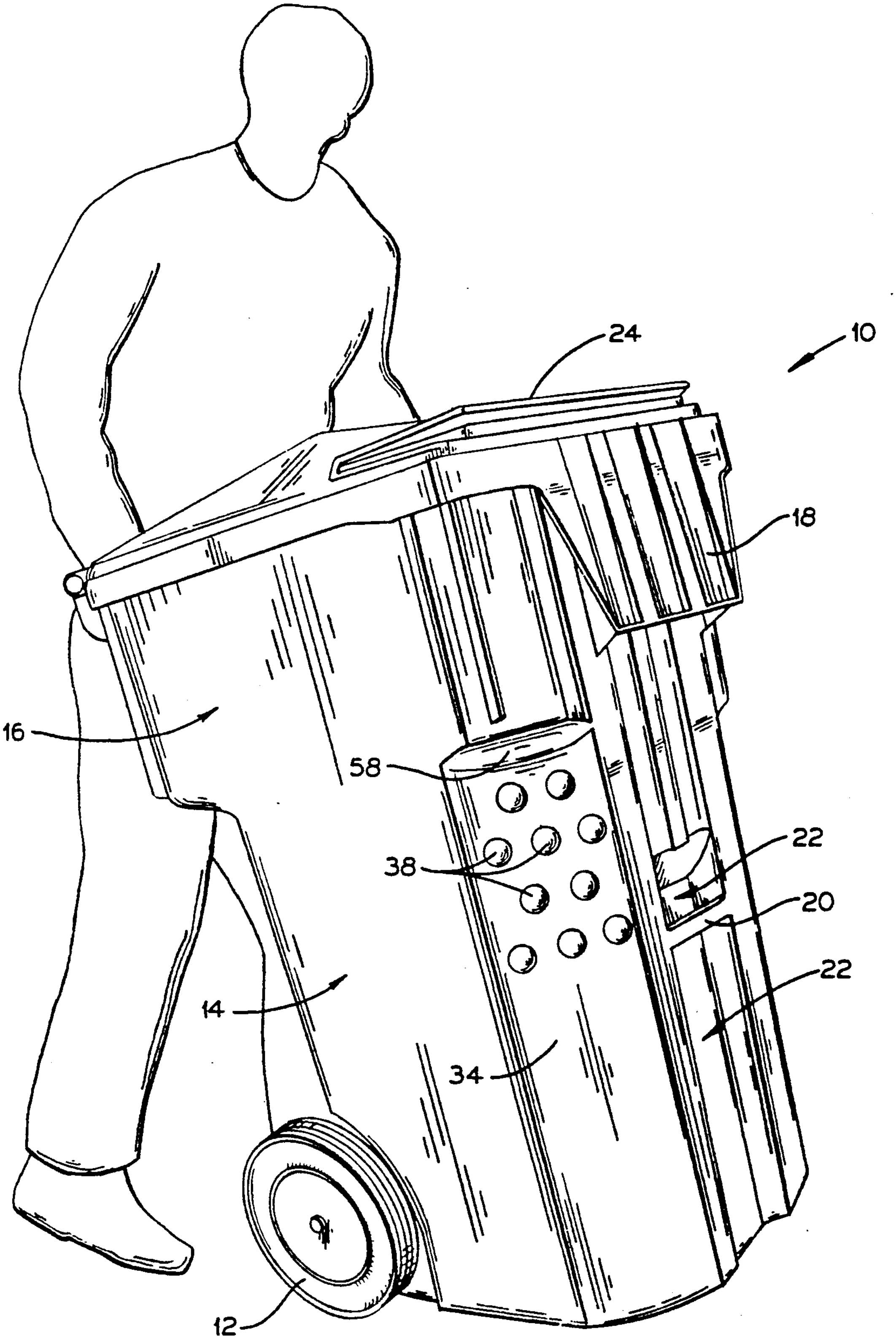
FIG. 1 is a view, taken in perspective of a preferred waste container according to the invention as it is being moved by the consumer.
Figure 2:
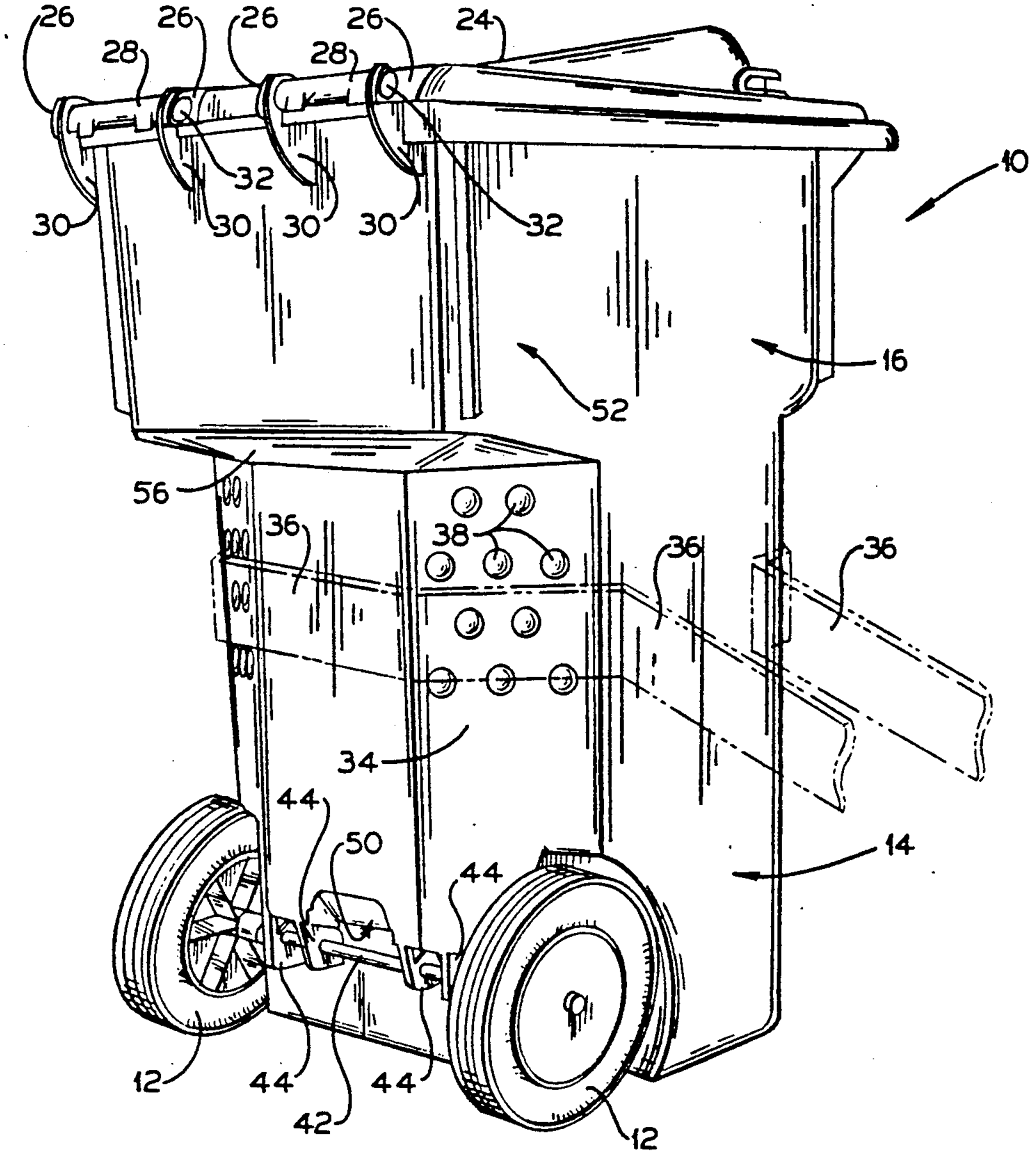
FIG. 2 is a rear perspective view of a preferred waste container of the invention and illustrates in phantom the gripping arms of a fully automated lifting system in contact with the lower portion of the waste container.

FIGS. 1 and 2 are perspective views of a preferred waste container of the invention. The multi-functional waste container 10 is shown in FIG. 1 being rolled on wheels 12. The waste container 10 includes a lower body portion 14 and an upper body portion 16. The lower body portion 14 has a smaller horizontal cross section than upper body 16.

A downwardly open receiving pocket 18 is provided on the front top of cart 10 for engagement with a semi-automated lifting apparatus. Such lifting pocket is disclosed and described in U.S. Pat. No. 4,765,503 to Otto et al., which is hereby incorporated by reference. An integral lifting bar 20 is provided transversely across recessed front vertical center channel 22.

Figure 5:
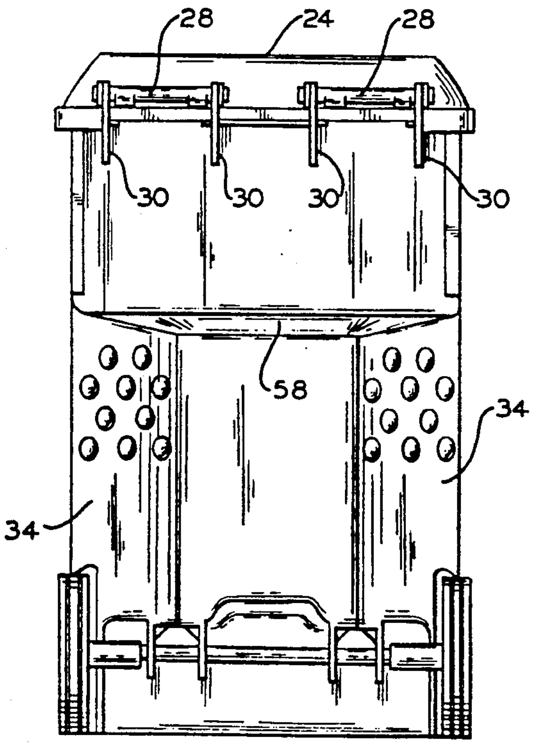
FIG. 5 is a rear plan view of the waste container shown in FIGS. 1 and 2.
Figure 9:
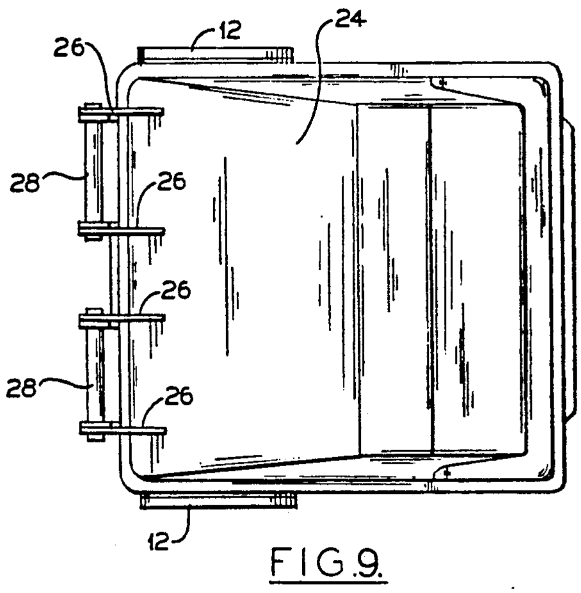
FIG. 9 is a top plan view of the waste container shown in FIGS. 1 and 2.

As shown in FIGS. 2, 5 and 9, a lid 24 is pivotably attached to the upper body portion 16 of container 10 via four flanges 26 which are integrally formed with the lid 24. The flanges are attached to the ends of two handles 28 which, in turn, are connected to the upper container body 16 via four flanges 30 which are integrally formed with the container body. Advantageously, handles 28 are hollow cylindrical members formed integrally with flanges 30. A set of four plastic hinge pins 32 are inserted through apertures in the four lid flanges 26 and are received in each end of the hollow plastic handles 28. The construction and operation of the plastic hinge pins 32 are disclosed in West German Patent No. 2800094422, and the operation thereof will be apparent to the skilled artisan.

Figure 8:
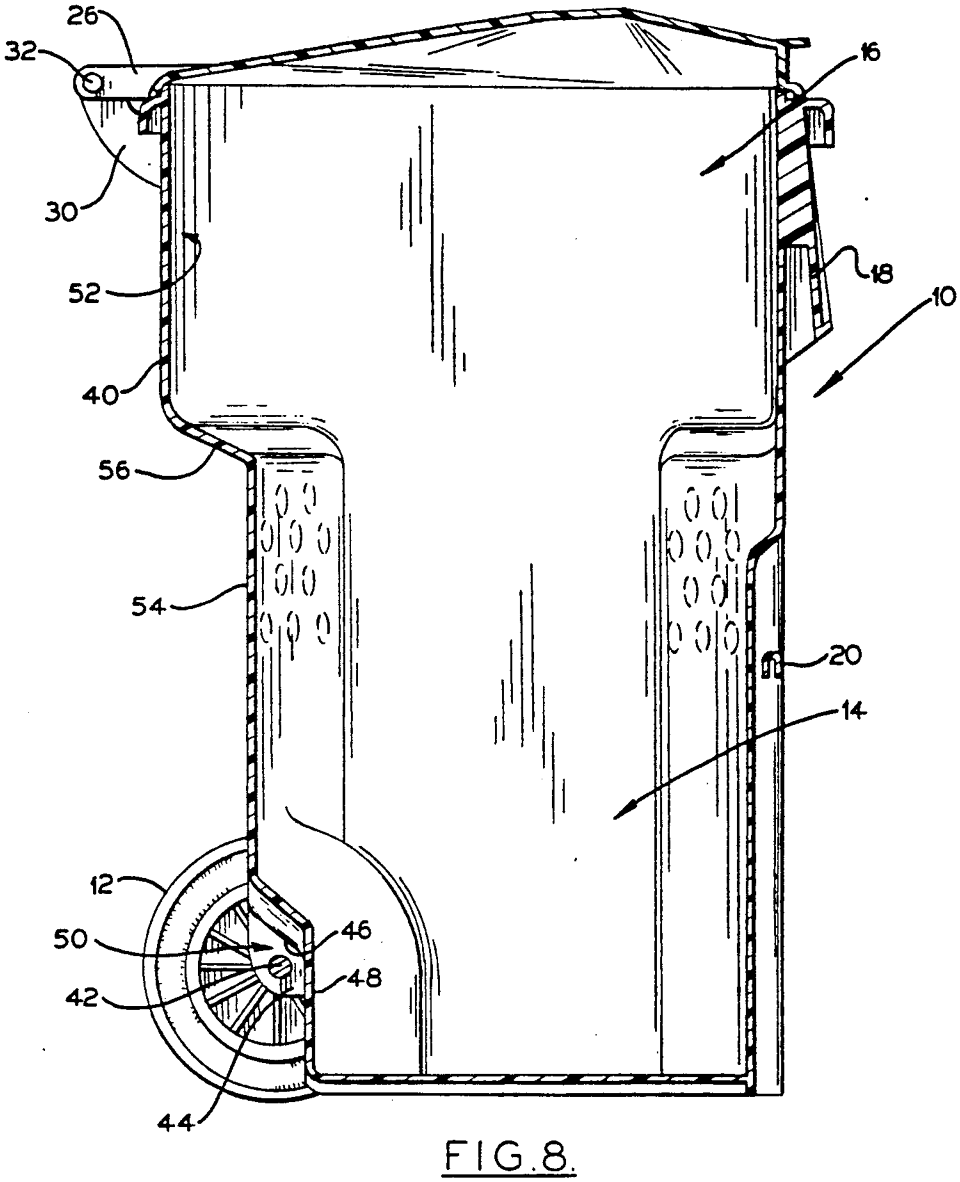
FIG. 8 is a cross-sectional view of the waste container shown in FIG. 6 and taken substantially along line 8—8 of FIG. 6.

As best seen in FIG. 8, the integral lid flanges 26 and the integral body flanges 30 each extend rearwardly to a position spaced from the rear of the container body. As will be apparent from FIGS. 5 and 9, the integral lid flanges 26 and the integral body flanges are substantially flat, planar members.

Figure 6:
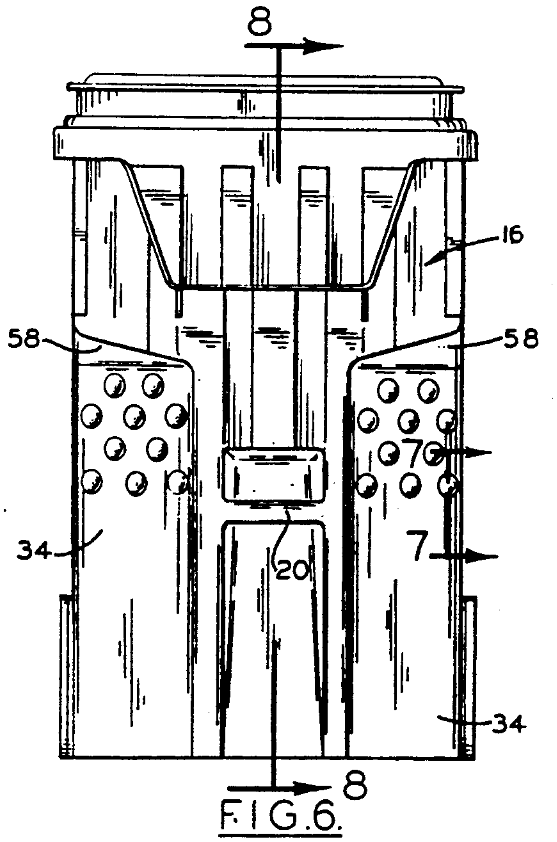
FIG. 6 is a front plan view of the waste container shown in FIGS. 1 and 2.

Returning to FIG. 2, the lower body portion 14 of the container includes four vertical exterior faces 34 which extend between the front and side wall portions of the lower container body (as best seen in FIG. 6), and between the rear and sidewall portions of the container (as best seen in FIG. 5). The four vertical exterior faces 34 are provided with an irregular and interrupted gripping surface for engagement with the clamping arms 36 of a fully automated lifting apparatus shown in phantom in FIG. 2. Advantageously, the irregular and interrupting gripping surface is provided by a series of hemispherically-shaped knobs 38 which extend outwardly from the four vertical, beveled corner faces 34. The interrupted and irregular gripping surface provided by hemispherical knobs 38 is advantageously provided in at least the upper part of the vertical sidewalls 34. Thus, hemispherically-shaped knobs 38 extend over the upper one-fourth to the upper one half of vertical faces 34.

Figure 7:
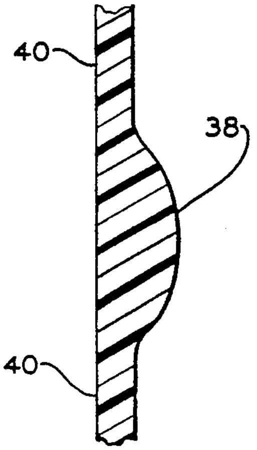
FIG. 7 is a an exploded cross-sectional view of a portion of the container wall taken substantially along line 7—7 of FIG. 6 and illustrates the construction of a hemispherically-shaped knob extending from the beveled corner face of the container which is employed to provide an improved gripping surface for the container.

In FIG. 7 there is illustrated a cross section of the wall of the container which includes hemispherical knob 38. It will be seen that the container wall is thickened at the location of knob 38. For example, the thickness of the normal wall portion 40 of the container can advantageously range from about three to about seven millimeters, preferably from about four to about five millimeters. The wall portion in the vicinity of knob 38 will typically be from about one to about four millimeters thicker; that is, hemispherical knob 38 will advantageously extend from about one to about four millimeters from the surface of the container, preferably about two millimeters or qreater.

It will be recognized that the irregular and interrupted gripping surface of faces 34 can be provided in various other forms. For example, a plurality of exterior projections in the form of horizontal strips, which can be continuous or broken, can be provided on vertical faces 34. Similarly, continuous or broken vertical strip-like projections can be provided on the vertical beveled corner faces 34. Preferably, the container walls will be thickened at the location of the projections.

The improved foot access means and toe hold provided in waste containers according to the invention is best shown in FIGS. 2, 5 and 8. Axle 42 which supports wheels 12, and is advantageously a solid rod made of a strong material, preferably a galvanized steel rod having a diameter of from 0.75 to 1.25 inch. The axle 42 is supported through apertures in four exterior, rearwardly extending body flanges 44 which are integrally formed with the body of container 10. As best seen in FIG. 8, the flanges 44 are integrally connected to an undercut shoulder portion 46 and a forwardly inset wall portion 48 of the lower rear wall 54 of the container body. An access channel 50 extends into the center of the lower rear wall 54 of the container above the axle 50. The channel extends into the rear wall forwardly past the axle so that an upper exposed portion of the axle can be accessed by the foot of a consumer. Thus, the waste container 10 can be readily tilted rearwardly by gripping handles 28 and placing a foot into access channel 50 and onto axle 42 while pulling backward. Because the axle 42 is used as the surface for exerting force by the foot of the user, damage to the container body is minimized. Additionally, the use of exterior protrusions as a toe hold is eliminated thereby improving the ease of the molding process and removing a potential breakable part from the container.

Figure 3:
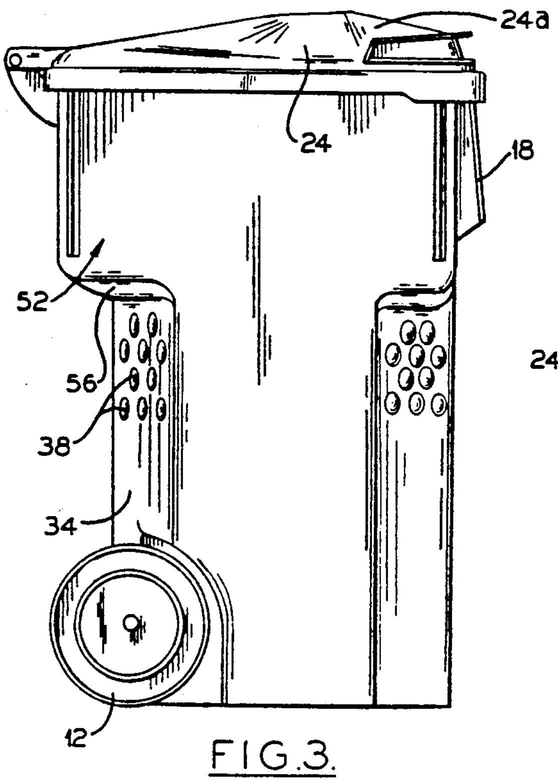
FIG. 3 is a side plan view of the waste container as illustrated in FIGS. 1 and 2.

The ease of rearwardly tilting the waste container 10 is also improved by provision of an upper, overhanging rear portion 52 of the cart as best seen in FIGS. 2, 3 and 8. With reference to FIG. 8, it is seen that the horizontal cross sectional area of the upper body portion 16 of the refuse cart 10 is greater than that of the lower body portion 14 of refuse cart 10. The rear section 52 of the upper body portion 16 extends rearwardly beyond the rear wall 54 of the lower body portion 18. This overhanging rear body portion provides additional space for refuse and also provides a counter balancing weight for rearward tilting of the container. Moreover, because handles 28 extend rearwardly from the rear upper body portion 52 of the waste container, increased leverage is provided for rearward tilting of the container.

An undercut shoulder 56 is formed between the rear upper portion and the rear lower portion of the container. Shoulder 56 extends fully across the rear of the container and functions to provide additional assurance against slippage of clamping arms 36 as the waste container 10 is being raised by the clamping arms. Two smaller integral undercut shoulders 58, best seen in FIGS. 1 and 6, are also formed on the front of the cart where the upper body section 16 intersects with the two front beveled corner faces 34.

Figure 4:
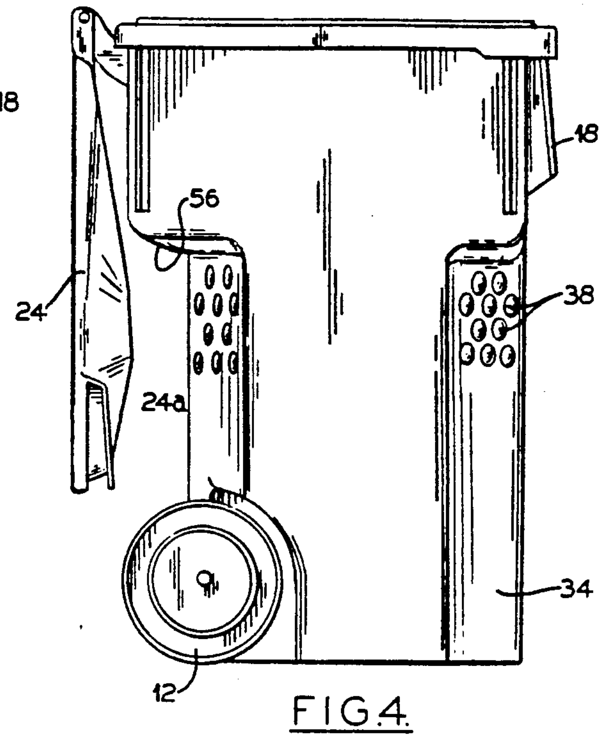
FIG. 4 is a side plan view of the waste container shown FIGS. 1 and 2 with the lid shown in a fully opened and hanging position.

As shown in FIGS. 3 and 4, lid 24 includes a domed portion 24A which is higher at the front of the cart than at the rear of the cart. When the lid is fully opened and allowed to hang behind the waste container body as shown in FIG. 4, the larger domed portion of the lid 24A can nest into the indented lower body portion of the container, beneath shoulder 56. This allows the lid to extend downwardly substantially perpendicular to the ground and parallel to the front and rear walls of the cart. In turn, this results in less space being used when the lid is fully opened and pivoted to its downward position. This allows for container bodies without wheels to be stacked or nested into each other for transport while minimizing the horizontal space being used by each stack of nested containers.

Figure 10:
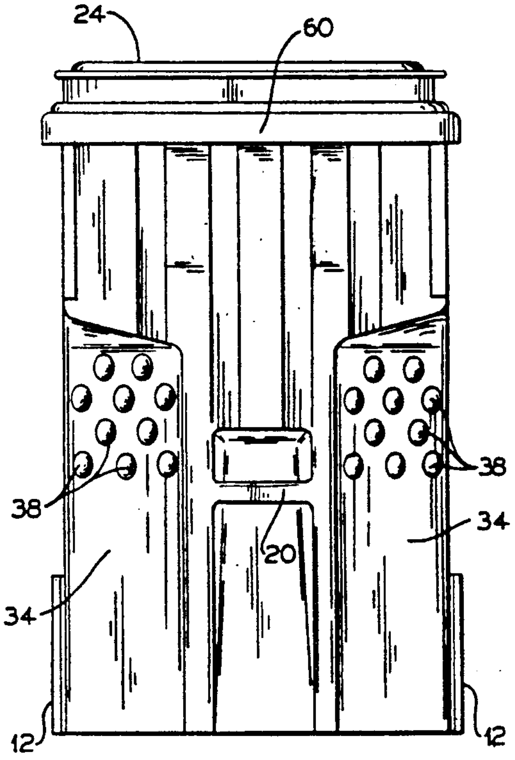
FIG. 10 is a front plan view of a modified form of the waste container shown in FIGS. 1 and 2 in which the front lifting pocket is eliminated.

FIG. 10 illustrates another embodiment of the invention in which the multi-functional refuse container of the invention is provided without the downwardly extending lifting pocket 18. In this embodiment of the invention, the multi-functional refuse container can be constructed identically to the containers shown in FIGS. 1-9 except for the absence of receiving pocket 18. A semi-automated European comb type lift system can be employed to lift these refuse container by means of horizontal bar 20 and the container rim 60 which is made according to the European comb design as described in for example, West German Patent No. DE 2648209C2. Alternatively, the cart can be lifted by the fully automated clamping arms of the type illustrated in FIG. 2.

The refuse containers illustrated in FIGS. 1-10 can be provided in various sizes ranging, for example, between about 50 and about 100 gallons, for example, 95 gallons by volume or 65 gallons by volume. Advantageously, the container is manufactured by injection molding of polyethylene polymer to provide a wall thickness of about three to about six millimeters, preferably four to five millimeters. Refuse containers so constructed and including the various preferred embodiments of the invention are capable of withstanding substantial abuse and exposure to heat and cold for substantial periods. Nevertheless, when constructed in accordance with the preferred embodiments of the invention, the waste containers can be readily tilted and rolled to and from curbside by an average consumer even when filled with substantial volumes of waste.

In addition, it will be apparent from the foregoing that the waste containers of the invention can readily be manufactured as a single integral piece. Since the container of the invention includes integral, apertured axle flanges, and integral, apertured lid flanges, no fasteners extending into or through the container body are required for attachment of the wheels or the lid. Attachment of external lifting pockets and/or lifting bars are not required since these are integrally molded in the container body.

The invention has been described in considerable detail with reference to its preferred embodiments. It will be apparent, however, that variations and modifications can be made without departing from the spirit and scope of the invention as described in the foregoing detailed specification and drawings and defined in the appended claims.

That which is claimed is:

1. A waste container comprising:

a container body for waste including a lower portion and an upper portion, the upper portion having a greater horizontal cross section than that of the lower portion; the lower portion of the container body extending upwardly more than half the height of the container body and having front, rear and opposite side wall portions, the lower portion of the container body further including four beveled corner portions defining four vertical exterior faces extending between the front and the side wall portions and the rear and the side wall portions of the lower container body, and wherein each of the four vertical exterior faces comprises an irregular and interrupted gripping surface for engagement by a lift apparatus clamping onto the lower portion of the container body, the irregular and interrupted gripping surface comprising a plurality of hemispherically-shaped knobs extending from the four vertical exterior faces, the wall thickness of the container body being greater at the hemispherically-shaped knobs than in the remainder of the four vertical exterior faces.

2. The waste container of claim 1 wherein the hemispherically-shaped exterior knobs extend at least about two millimeters from the surface of the four vertical exterior faces.

3. The waste container of claim 2 further including a means for rolling the container comprising a pair of wheels attached to the ends of an axle, the axle being secured to the rear of the lower portion of the container body adjacent the bottom and forward of the rear wall thereof.

4. The waste container of claim 3 wherein the upper portion of the container body extends rearwardly beyond the rear wall portion of the lower portion of the container body.

5. The waste container of claim 4 further including a generally horizontal undercut shoulder extending across the rear of the container body between the rearwardly extending upper portion of the container body and the rear wall portion of the lower portion of the container body.

6. The waste container of claim 5 further comprising two coaxial handles secured to the upper portion of the container body adjacent the top thereof, the handles being spaced rearwardly from and positioned generally parallel to the rear upper edge of the container body.

7. The waste container of claim 6 further including a container lid pivotably attached to the handles, the lid comprising two pairs of generally planar integrally formed flanges extending rearwardly and perpendicularly from the lid, the pairs of flanges being pivotably secured to the two coaxial handles of the container body so that each of the handles extends between one pair of the integrally formed lid flanges.

8. A waste container comprising:

(a) a container body for waste having front, rear and opposite side wall portions and further comprising an upper portion and a lower portion, the lower portion comprising more than half of the height of the container body, the upper portion having a horizontal cross section including front, rear and opposite side wall portions, the upper portion of the container body having a larger horizontal cross section than that of the lower portion of the container body, and wherein the upper portion of the container body extends rearwardly beyond the rear wall portion of the lower portion of the container body, said container body having handle means secured to an upper rear end portion of the container body;

(b) means for rolling the container body comprising a pair of wheels attached to the ends of an axle, the axle being secured to the exterior of a forwardly inset portion of the rear wall of the container body adjacent the bottom thereof; and (c) a foot access means for assisting the user in tilting of the container comprising a channel formed in the rear wall portion of the container body extending upwardly above and inwardly into the rear wall beyond an exposed portion of the axle sufficiently to thereby allow access of a user's foot to the exposed portion of the axle so that the user's foot to the exposed portion of the axle so that the user's foot can be placed on the axle to assist in tilting the container when the handle means is grasped and pulled rearwardly by the user.

9. The waste container of claim 8 wherein the container body comprises an upper portion and a lower portion, the lower portion comprising more than half of the height of the container body, the upper portion having a horizontal cross section including front, rear and opposite side wall portions, the upper portion of the container body having a larger horizontal cross section than that of the lower portion of the container body, and wherein the upper portion of the container body extends rearwardly beyond the rear wall portion of the lower portion of the container body.

10. The waste container of claim 8 wherein said handle means comprises two coaxial handles secured to the housing adjacent the top thereof, the handles being spaced rearwardly from and positioned generally parallel to the rear upper edge of the housing.

11. The waste container of claim 10 further including a container lid pivotably attached to the handles, the lid comprising two pair of generally planar integrally formed flanges extending rearwardly and perpendicularly from the lid, the pair of flanges being pivotably secured to the two coaxial handles of the container body so that each of the handles extends between one pair of the integrally formed lid flanges.

12. The waste container of claim 8 wherein the lower portion of the container body includes four beveled corner portions defining four vertical exterior faces extending between the front and the side wall portions and the rear and the side wall portions of the lower container body, the four vertical exterior faces each comprising an irregular, interrupted gripping surface for engagement by a lift apparatus clamping onto the lower portion of the container.

13. The waste container of claim 12 wherein the irregular, interrupted gripping surface of the four vertical exterior faces of the lower container body extends over a portion of the four vertical exterior faces comprising the upper one-fourth to upper one-half of the four vertical exterior faces.

14. The waste container of claim 13 wherein the irregular and interrupted gripping surface of the four vertical exterior faces is defined in part by a plurality of exterior projections on the four vertical exterior faces.

15. The waste container of claim 14 wherein the plurality of exterior projections comprise hemispherically-shaped exterior projections.

16. The waste container of claim 8 further comprising a plurality of rearwardly extending body flanges extending from said forwardly inset portion of the rear wall of the container body adjacent the bottom thereof, said plurality of flanges supporting said axle.

* * * * *